Patented Feb. 12, 1946

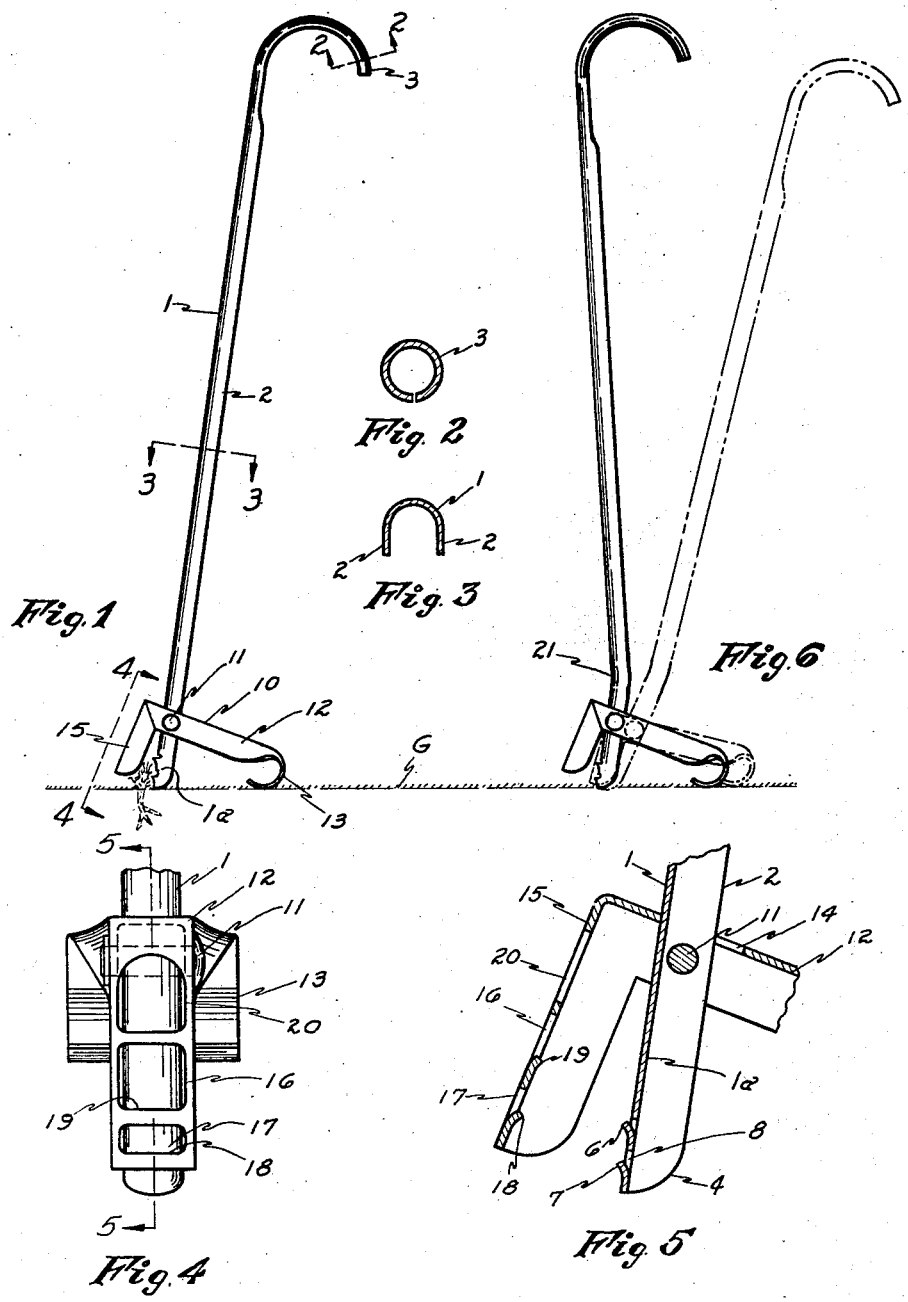

2,394,568

UNITED STATES PATENT OFFICE 2,394,568

WEED EXTRACTOR

Kenneth D. Stewart, Carleton, Mich.

Application October 12, 1944, Serial No. 558,384

4 Claims. (Cl. 254—132)

This invention relates to a device for pulling or extracting weeds or other plant growth from the earth. The device of the invention probably finds its greatest use in connection with pulling weeds although it may be useful in pulling or extracting root vegetables, but for convenience it will be herein termed a weeding device.

The general object of the invention is to provide an improved weeding device having clamping jaws which upon manipulation of a suitable handle clamps the weed and then by a leverage action pulls the same from the earth. The clamping jaws are formed to provide a cooperating clamping action and are arranged to interfit with each other. Inasmuch as the jaws are to be clamped to the weed and may sometimes be projected at least partially into the ground, the jaws are apertured so that earth may be squeezed from between the jaws. In the action of the mechanism a part serves as a fulcrum and this is formed for sliding movement along the surface of the earth in the action of bringing the jaws together for clamping purposes. A further object is to provide a tool of simple construction so that it can be cheaply made and supplied to the public at low cost. Also, since the pulling or extracting action is, as will be later seen, accomplished by a pivoting movement of the handle as a lever the handle may be of angular construction so that it does not have to be lowered to an inconvenient position in the pulling action.

A device constructed in accordance with the invention is shown in the accompanying drawing. In this drawing:

Fig. 1 is an elevational view of a weeding device constructed in accordance with the invention showing the same in a position about to be applied to a weed.

Fig. 2 is an enlarged cross sectional view taken substantially on line 2—2 of Fig. 1.

Fig. 3 is a cross sectional view taken on line 3—3 of Fig. 1.

Fig. 4 is an enlarged end elevational view of the weed gripping end of the tool looking substantially on line 4—4 of Fig. 1.

Fig. 5 is a sectional view taken substantially on line 5—5 of Fig. 4.

Fig. 6 is a view in full lines and in dotted lines showing the action of the tool and illustrating a modified form.

The weeding tool comprises a main body portion in the form of a lever arm 1. This arm may conveniently be made of sheet or strip metal fashioned substantially into U-shape in cross section, as shown in Fig. 3. The bight portion of the U is preferably positioned in what may be termed the forward position while the legs 2 of the U extend backwardly. The tool may be provided with a suitable handle 3 and this may be of rounded form in cross section provided by closing the U-shape into a substantially circular shape as shown in Fig. 2.

The portion 1 may be substantially straight from the handle to the lower end. The lower end is fashioned as a ground engaging or penetrating portion 1a and for gripping the growth to be extracted. To this end the legs of the U are preferably rounded as illustrated at 4 while the bight portion is formed with forwardly extending projections to provide gripping elements. This is accomplished by cutting or piercing the metal and fashioning the pierced section so that it bends forwardly to provide a gripping edge 6, and a second gripping edge 7. Preferably some of the metal is removed to provide an opening 8. The opening 8 provides for the squeezing of some of the earth therethrough for purposes which will presently appear.

There is a cooperating member pivotally mounted on the body member and this is generally indicated at 10. This member may be formed from sheet or strip metal and pivotally mounted to the member 1 by a bolt or suitable fulcrum member 11. This member is of angular construction having one arm 12 extending in a direction which may be considered rearwardly and this arm may be of channel or U construction for strength-giving purposes as shown in Fig. 5. The end of the arm 12 is fashioned into a ground engaging part 13. This may be done by fashioning the metal into curved form, as shown, with the channel formation of the arm 12 gradually merging into a cross section which is flat but curved as shown. This provides sort of a skid which will slide along the surface of the ground in the manipulation of the tool.

The other arm of the angular gripping member is shown at 15 and it is of channel or U construction in cross section, as shown in Fig. 5. The bight portion of the arm 15 is cut out to provide apertures 16 and 17 and the material forming the lower edges of the openings is bent to provide gripping edges 18 and 19. It will be seen, accordingly, that the gripping edges 18 and 19 project toward the gripping portion 1a while the edges 6 and 7 project toward the arm 15. The arm 15 may be provided with an additional opening 20 if desired.

In Fig. 6 the construction is the same as the construction already described with the modification that the shaft or main portion is provided with a bend 21 which normally throws the upper portion into a forwardly inclined position when the gripping portion is substantially vertical.

In the use of the tool, it may be applied to the ground as substantially shown in Fig. 1, the ground line being represented at G. In this position the lever arm 12 of the gripping device gravitates and lies on the ground and this separates the arm 15 from the lower or gripping portion 1a of the main part. If desired, the part 1a may be forced somewhat into the ground. It will be noted that in this position the main part 1 may be slightly angularly disposed; that is, angular relative to the vertical. With the arrangement shown in Fig. 6 the bend line causes the main part of the handle to extend angularly in the opposite or forward direction. It will be understood, of course, that the part 1a is to be positioned closely adjacent a weed as shown in Fig. 1. The shaft of the tool is then shifted in a direction from left to right as Figs. 1 and 6 are viewed with the tool more or less pivoting about the point where the portion 1a rests upon or projects into the ground. In this action the fulcrum 11 shifts to the right as indicated by the dotted lines in Fig. 6, and the slide 13 slides along the surface of the wall. The relative pivoting action causes the part 15 to swing toward the part 1a and to grip the weed between these two parts. The channel or U shape construction of the arm 15 fits over the part 1a as shown by the dotted lines in Fig. 6 and the weed is gripped therebetween with the cooperating edges 6 and 7 on the part 1a and 18 and 19 on the part 15 gripping firmly into the growth. At this point, the pivoting action around the fulcrum 11 stops and then the tool, by pushing downwardly on the handle, is rocked about the part 13 as it fulcrums on the ground and thus the cooperating portions 15 and 1a are elevated from the ground with a rocking action around the part 13 and the weed is pulled or extracted. By placing the bend 21 in the handle or shaft the said handle or shaft is in a more forward position at the commencement of the operation and, accordingly, the handle part 3 does not have to be shifted to an uncomfortably low position in the extraction of the weed.

I claim:

1. A device for pulling weeds or other growth from the earth comprising, a shaft having a handle portion and a gripping portion adapted to engage the ground, a gripping member pivotally mounted to the shaft at a point above the gripping portion of the shaft, said gripping member being of angular form and having a lever arm and a gripping arm, a ground engaging skid on the end of the lever arm adapted to slide along the ground as the shaft is shifted to rock the gripping member on the pivot and cause the gripping arm to swing toward the gripping portion of the shaft to grip a weed or growth therebetween, said gripping arm being substantially U shape in cross section and adapted to fit around the gripping portion of the shaft, the bight portion of the gripping arm having one or more apertures therein so that earth trapped between the gripping arm and the gripping portion of the shaft may be squeezed out therethrough.

2. A device for pulling weeds or other growth from the earth comprising, a shaft having a handle portion and a gripping portion adapted to engage the ground, a gripping member pivotally mounted to the shaft at a point above the gripping portion of the shaft, said gripping member being of angular form and having a lever arm and a gripping arm, a ground engaging skid on the end of the lever arm adapted to slide along the ground as the shaft is shifted to rock the gripping member on the pivot and cause the gripping arm to swing toward the gripping portion of the shaft to grip a weed or growth therebetween, said gripping arm being substantially U shape in cross section and adapted to fit around the gripping portion of the shaft, the bight portion of the gripping arm and gripping portion of the shaft each having one or more apertures therein so that earth trapped therebetween, as they come together, may be squeezed out therethrough.

3. A device for pulling weeds or other growth from the earth comprising, a shaft having a handle portion and a gripping portion adapted to engage the ground, a gripping member pivotally mounted to the shaft at a point above the gripping portion of the shaft, said gripping member being of angular form and having a lever arm and a gripping arm, a ground engaging skid on the end of the lever arm adapted to slide along the ground as the shaft is shifted to rock the gripping member on the pivot and cause the gripping arm to swing toward the gripping portion of the shaft to grip a weed or growth therebetween, said gripping arm being substantially U shape in cross section and adapted to fit around the gripping portion of the shaft, the gripping arm and the gripping portion of the shaft comprising metal bodies and each having metal parts struck out therefrom in facing relationship to provide biting edges for engaging the weed or growth.

4. A device for pulling weeds or other growth from the earth comprising, a shaft having a handle portion and a gripping portion adapted to engage the ground, a gripping member pivotally mounted to the shaft at a point above the gripping portion of the shaft, said gripping member being of angular form and having a lever arm and a gripping arm, a ground engaging skid on the end of the lever arm adapted to slide along the ground as the shaft is shifted to rock the gripping member on the pivot and cause the gripping arm to swing toward the gripping portion of the shaft to grip a weed or growth therebetween, the gripping arm and the gripping portion of the shaft both being of metal substantially U shape in cross section and arranged to interfit in gripping relationship with their bight portions adjacent each other, said bight portions each having one or more apertures therein through which trapped earth may be squeezed and the lower horizontal edges of at least one of said apertures in each bight portion being fashioned to extend into the space between the gripping arm and the gripping portion of the shaft to provide biting edges for engaging the weed or growth.

KENNETH D. STEWART.